Aug. 27, 1968    F. W. JOHN    3,398,427
APPARATUS FOR SIMULTANEOUSLY BLOW MOLDING AND COMPRESSION MOLDING PLASTIC CONTAINERS
Filed Aug. 6, 1965    5 Sheets-Sheet 1

INVENTOR
FREDERICK W. JOHN

BY *Le Blanc & Shur*
ATTORNEYS

FIG.16  FIG.17

United States Patent Office 3,398,427
Patented Aug. 27, 1968

3,398,427
APPARATUS FOR SIMULTANEOUSLY BLOW MOLDING AND COMPRESSION MOLDING PLASTIC CONTAINERS
Frederick W. John, Rochester, N.Y., assignor to The Nalge Company, Inc., Rochester, N.Y., a corporation of New York
Filed Aug. 6, 1965, Ser. No. 477,692
20 Claims. (Cl. 18—5)

ABSTRACT OF THE DISCLOSURE

There is disclosed herein an improved plastic liquid container together with method and apparatus for manufacturing the same. The container is characterized by unitary blow molded construction and has among its features an integral blow-molded discharge tube, and preferably also an integral compression molded removable closure. The apparatus includes a mold and a molding machine with the mold being characterized by two engageable mold sections each having one or more cavities of proper configuration to form the container and a compression molding die portion to form the closure. The mold is constructed according to certain dimensional relationships so as to produce an operative and commercially acceptable product. Suitable dimensional relationships are maintained between the mold and the remainder of the molding machine for like purposes. Also characteristic of the machine is the facility to control blowing pressure in relation to degree of mold closure. The method of this invention is characterized by the concurrent blow molding of the container and discharge tube and compression molding of the various container portions and by control of the degree and times of pressurization in relation to the degree of mold cloure to produce a properly formed container.

---

This invention relates to apparatus for the blow molding of a plastic liquid container dispenser, such as a laboratory wash bottle, reagent dispenser, or the like, having a plastic discharge tube integrally molded therewith, and also having a cap integrally molded therewith when desired.

A wide variety of liquid dispensing containers are in use which have attached thereto various spouts or other tubes for discharging or receiving liquids. Typically, in the manufacture of such liquid dispensers, the container and the discharge tube are separately fabricated, after which the parts are assembled to produce the finished article.

It has been the standard procedure in the fabrication of plastic laboratory wash bottles or other similar plastic liquid dispensers to fabricate the bottles or container portion by various well known blow molding techniques and to later attach a suitable length of plastic tubing to provide a discharge means. In such laboratory wash bottles, it is desirable that the discharge tube have its upper end bent into a downwardly depending spout for convenient use. Since the discharge is provided by compression of the flexible walls of the bottle, it is further desirable that the discharge tube extend nearly to the bottom of the bottle, to minimize the amount of fluid which cannot be expelled; however, the tube should not rest on the bottom of the bottle or the supply of fluid may be cut off. An additional requirement for such a bottle is that it be conveniently fitted with a suitable closure for its filling opening both to prevent spilling or contamination of the contents and to prevent excessive pressure relief when the bottle walls are compressed.

In previous wash bottles, after the container portion has been fabricated by blow molding, an opening is made in the upper end thereof and a suitable length of plastic tubing, bent to provide the discharge spout, is inserted. While such bottles have enjoyed substantial commercial success (applicant's employer being a major producer of the same), such prior wash bottles and liquid dispensers entail certain disadvantages due to their construction and the fabricating technique outlined above.

In particular, because it is necessary to produce the wash bottle in multiple separate stages, the process is time consuming and as a result, quite expensive. In addition, with the prior construction, the opening provided in the bottle for insertion of the discharge tube must be very accurately made since if it is too large, the discharge tube will drop to the bottom of the bottle cutting off the fluid supply, or else liquid will leak from around the tube. On the other hand, if the opening is made too small, the tube will be difficult to insert, and attempts to insert it in an opening of too small a size may result in cracking of the container wall.

Also, the closure for such bottles has been produced separately heretofore, resulting in a further increase in equipment, production time and costs.

It is accordingly an object of this invention to provide novel apparatus for blow molding a plastic wash bottle or like container having a concurrently blow molded discharge tube. It is a related object to provide a novel apparatus for blow molding a complete laboratory wash bottle or the like which does not leak or have other shortcomings of prior wash bottle constructions (and like containers).

It is another important object of this invention to provide novel apparatus for fabricating a blow molded plastic wash bottle or the like in such manner as to more efficiently utilize the plastic material than heretofore possible.

It is a related object of this invention to provide novel apparatus for drastically reducing the cost of laboratory wash bottles and the like, by novel apparatus and improved utilization of the starting material.

It is a further object of this invention to provide novel apparatus for simultaneously fabricating an improved blow molded plastic bottle with a simultaneously compression-molded integral cap. It is another related object of this invention to provide novel improved apparatus for blow molding plastic wash bottles and like containers with a simultaneously compression molded integral cap connected to the bottle by a strap.

The present invention accomplishes the above-enumerated objects by simultaneous blow molding of the container and a suitably shaped and positioned discharge tube. Particular features of the present invention include a sectional mold of novel configuration, by which the container and its discharge means may be simultaneously blow molded, and which may be readily adapted to include means for the concurrent compression molding of a cap or other closure means.

Another feature of the present invention resides in the particular arrangement of the blow molding apparatus whereby a bottle possessing high strength and quality may be produced using a minimum of starting material. Further features of the present invention reside in the utilization of a novel improved fabrication technique achieving advantages from particular positioning of the molding material with respect to the mold, and in the provision of suitable pre-blow conditions during assembly of the mold around the molding material ("parison") prior to actual blow molding of the bottle, etc.

The exact nature of the present inventions, and other objects, advantages and features thereof will be readily apparent from consideration of the following specification with reference to the annexed drawings in which.

Figure 18:
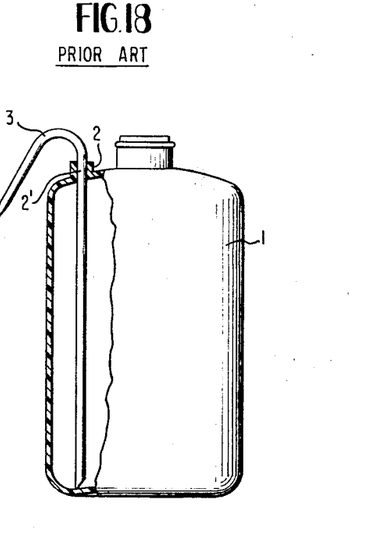
FIGURE 18 is an illustration of a typical prior art wash bottle.

Referring first to FIGURE 18, for background, there is shown an example of commercially available plastic wash bottles made by techniques heretofore employed. Such a wash bottle typically comprises a blow-molded container portion 1 having a boss 2 at the upper end thereof which is drilled to provide aperture 2' through which a suitably bent discharge tube 3 may be inserted. As previously indicated, this wash bottle construction such as shown in FIGURE 18, which has been used for many years, entails a number of long recognized difficulties and disadvantages from the viewpoints of production, reliability and cost, resulting from the necessity of preparing and inserting the bent tube 3 in the carefully positioned and sized opening 2' in boss 2.

Figure 4:
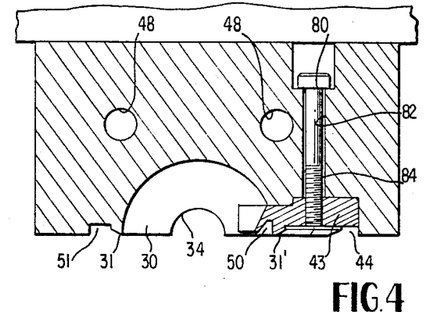
FIGURE 4 is a cross sectional view of one of the blow mold sections, taken along line 4—4 in FIGURE 1.
Figures 4A, 7, 8:
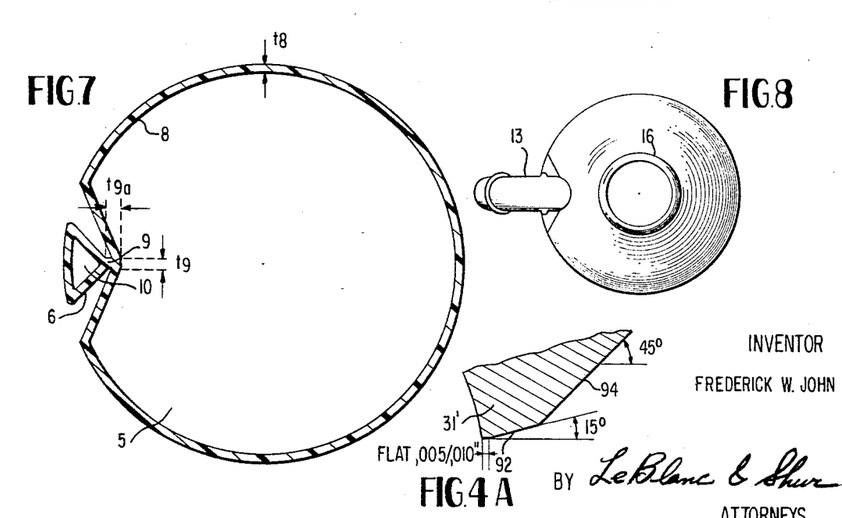
FIGURE 4A is an enlarged view showing a preferred construction of a portion of FIGURE 4.
FIGURE 7 is a horizontal cross sectional view of the bottle and discharge tube taken along line 7—7 in FIGURE 6.
FIGURE 8 is a top plan view of the bottle and tube of FIGURE 6.
Figure 6:
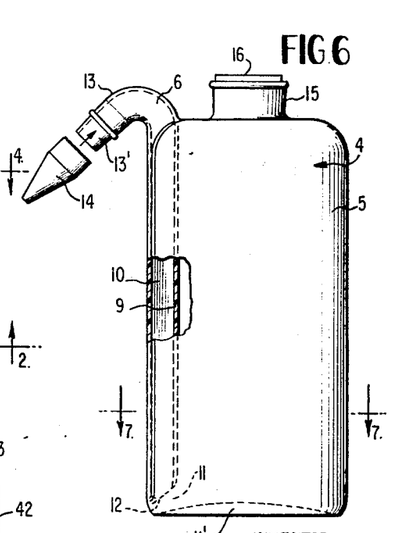
FIGURE 6 is a side elevation view of the unitary blow molded wash bottle of this invention, with a cutaway portion of the main bottle portion to show part of the discharge tube in section.

In contrast, the unitary blow molded wash bottle 4 of the present invention, shown in FIGURES 6 through 8, comprises a main container or body portion 5 and an intergral discharge tube portion 6. As shown in FIGURES 6 and 7, main bottle wall 8 is pinched and welded at web 9 to form a longitudinal passage 10 through the discharge tube portion. As shown in FIGURE 6, discharge passage 10 is in communication with the inside of main container portion 5 of bottle 4 through an opening indicated at 11, since the pinched web portion 9 forming discharge tube 6 extends only to a predetermined point 12 slightly above the bottom of main container portion 5. In addition, discharge tube 6 includes a simultaneously blow molded downwardly depending spout portion 13, the particular configuration of which is designed to suit the contemplated use of the bottle (e.g. as laboratory wash bottle, squeeze-spray bottle, etc.). For a laboratory wash bottle, a separately molded tapered tip 14 may be provided on the end section 13' of spout 13 which is molded to suitable design for this purpose. In addition, bottle 4 generally includes a neck portion 15, having a suitably shaped lip 16. The container portion 5 and discharge tube 6 of novel unitary bottle 4 are simultaneously blow molded, as will now be described.

Figure 1:
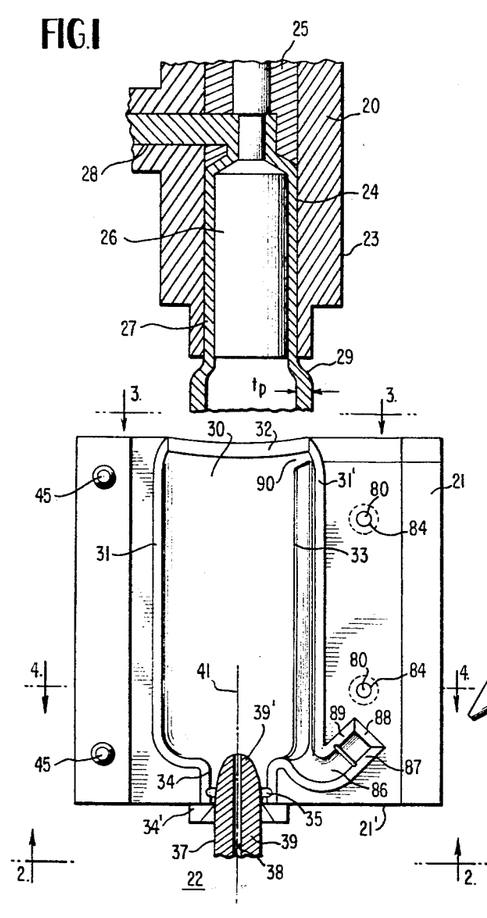
FIGURE 1 is a vertical partly sectional view of the blow molding apparatus of this invention showing the relation of the extruding head and blow pin and part of the parison to one of the blow mold sections.

In order to produce the bottle shown in FIGURES 6 through 8, molding apparatus such as shown in FIGURES 1 through 4 may be used. FIGURE 1 shows the general construction and arrangement of novel blow molding apparatus according to the present invention, a number of nonessential features having been eliminated to facilitate a clearer showing and explanation. The apparatus comprises a conventional extruding head such as shown at 20, a novel two piece blow mold having two complementary like sections such as shown at 21, and a suitable blowing mechanism such as a calibrated blow pin 22.

As illustrated, extruding head 20 comprises a body portion 23, having a die section with longitudinal bore 24, and sealed at its upper end by a plug 25. Suitably supported, as by plug 25, is a mandrel or core 26 coaxial with the longitudinal bore 24 of such diameter as to provide a land section with an annular extruding passage 27 having a suitable annular dimension for the desired wall thickness of the parison to be extruded from head 20. A passage 28 is provided in communication with bore 24 so that plasticated plastic material may be supplied to extruding annulus 27 in any convenient known manner, as by an extruder. As the plasticated plastic material (e.g. polyethylene) passes from the end of annular extruding passage 27, it forms the plastic parison 29 from which the bottle will be blow molded.

As the parison 29 is formed by the extruding annulus 27, it extends downward between the opposed mold like sections 21 and 21a (see FIGURES 9–11) until a sufficient length of parison has been extruded from which to blow mold the bottle. (This would be a small distance beyond the lower edge 21' of mold section 21.)

As shown in FIGURES 1 and 9–11, each of mating mold sections 21 and 21a comprises a recessed portion 30 corresponding in shape to that of the bottle to be blown. The outer side edges of recess 30 are defined by longitudinally extending raised lands 31 and 31' which coact with corresponding lands on the other mold half section 21a to seal the sides of the mold cavity (see FIGURE 11) in conjunction with lands 32 on each of mold sections 21 and 21a, defining the bottom of the bottle cavity. Bottom lands 32 serve to pinch off the part of parison 29 which is to be blown into a bottle from the upper portion of the parison 29 adjacent extruding head 20 and also to seal the upper end of the tubular parison disposed within the mold to enable expansion thereof to fill the mold cavity 30 when the bottle is blown. An additional land 33 extends longitudinally of each of mold sections 21 and 21a to a point adjacent bottom land 32 and spaced a small distance from side land 30' thus forming a pinched off area which separates the container portion 5 of the blow molded bottle 4 from the unitary discharge tube 6. Cavity 30 of each of mold sections 21 and 21a is provided with a region of reduced transverse dimension 34 terminating in a neck plate 34' corresponding in shape to that of neck 15 for the blow molded bottle 4 (see FIGURES 1, 2, and 6). Neck forming mold portion 34 also is provided with a further recessed groove 35 defining the lip 16 of the blow molded bottle 4.

The blow molding arrangement illustrated in FIGURE 1, with extruder head 20 above mold sections 21 and 21a, and blow pin 22 below the mold sections for entry into downwardly disposed mold neck forming portion 34 is representative of the arrangement for use of the present invention on a "Kautex" type plastic blow molding machine such as made and sold by Kautex-Werke, Reinold Hagen, Hangelar Sieburg, West Germany.

Alternatively, the inventive concepts disclosed herein are readily adaptable for use with other commercially available blow molding apparatus such as the type shown in U.S. Patent No. 3,120,679 which, while directed to substantially different subject matter, shows another commercially available molding apparatus having the extruding die and blow pin combined into a unitary element or blow head. The manner of use of such alternative apparatus to practice the present invention will be apparent to those skilled in the art in light of the disclosure herein, whereby further detailed discussion thereof is deemed unnecessary.

Referring still to FIGURE 1, the blowing mechanism, i.e., blow pin 22, shown in blowing position, comprises a body portion 37 having therein an air passage 38 which is connected to a suitable compressed air source in known manner. Body portion 37 includes a generally cylindrical portion 39 which cooperates with recess 35 and neck plate 34' on the mold sections to form bottle lip 16 (see FIGURE 6). The blow pin also includes an upper portion 39', shown having a generally tapered configuration beginning in the region adjacent recess 35, although it should be understood that a cylindrical configuration (or any other operative configuration) may be employed. When the two mold sections 21 and 21a are fully closed, blow pin portion 39' is fully inserted in the neck forming opening defined by mating portions 34 of the two mold section 20 and 20a, and a seal is provided at the lower end of the mold cavity by pinching of part of the parison 29 between blow pin part 39 and neck forming mold portions 34 and 35.

Thereupon, the introduction of compressed air (or other suitable pressurized fluid) through blow pin passage 38 will cause the semi-fluid parison to expand into conformity with the walls of the cavity formed by the interior of two closed mold sections 21 and 21a, as amplified below, while blow pin portion 39' and the mating mold neck portions 34 in effect compression mold the neck 15 of bottle 4 (shown in FIGURE 6).

Figure 2:
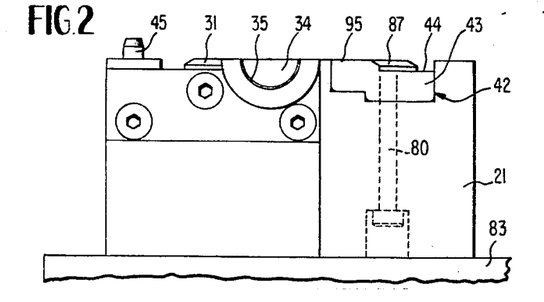
FIGURE 2 is a bottom plan view of the blow mold section of FIGURE 1 (looking in the direction of arrows 2—2 in FIGURE 1)
Figure 3:
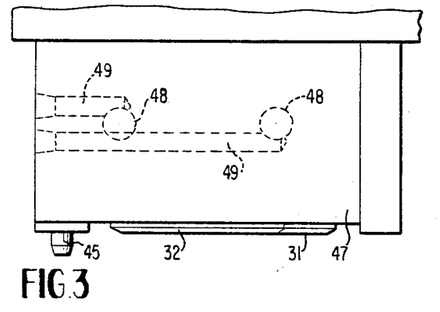
FIGURE 3 is a top plan view of the blow mold section of FIGURE 1 (looking in the direction of arrows 3—3 in FIGURE 1)

Further details of the construction of the novel blow molding apparatus according to this invention may be understood by reference to FIGURES 2 through 4, in conjunction with FIGURE 1. FIGURE 2 which is a bottom plan view of the mold section 21 of FIGURE 1, shows the land 32 at the upper end of the mold (see also FIGURES 1 and 3), the reduced diameter neck forming portion 34 of land 31, and the lip forming recess 35. As disclosed, each of mold sections 21 and 21a includes a groove 42 extending longitudinally of the mold body as shown in FIGURE 1 and having a cross sectional shape as shown in FIGURES 2–4 and 9–11. There is disposed in groove 42 an alloy tool steel insert 43 of cross sectional shape shown in FIGURES 2–4 and 9–11, and having a plan configuration as shown in FIGURE 1, from which it will be apparent that insert 43 forms a land 33 and a substantial part of side land 31' (for about the same longitudinal extent as land 33) merging into bottom land 32. (See FIGURE 1). Each insert 43 is retained in groove 42 of mold sections 21 and 21a respectively by a plurality of cap screws 80 extending through apertures 82 in the main body of each of mold sections 21 and 21a, and secured in threaded apertures 84 in inserts 43. (See FIGURES 1, 2 and 4.) Each of mating mold inserts 43 is provided with a groove 86 of arcuate shape as shown in FIGURE 1 and substantially semi-circular cross section, and bounded by conventionally relieved pinching lands 87, 88 and 89 (merging with land 31') to form the spout portion 13–13' extending downwardly from discharge tube 6 of blow molded wash bottle 4 (see FIGURE 6). Referring to FIGURES 2, 4 and 9–11, the thickness of insert 43 is less than the depth of groove 42 in each of mold sections 21 and 21a a sufficient amount to provide a flash relief depression 44 to accommodate excess material from the blow molded plastic parison 29.

To provide accurate alignment between complementary mold sections 21 and 21a, pins 45 may be provided on one of the mold sections 21 for fitting into a complementary bushing 45' in the other mold section 21a.

FIGURE 3 shows a top plan view of mold section 21, and illustrates that each of the mold sections 21 and 21a is usually provided with suitable heat exchanging means, such as the bores 48 shown in communication with coolant passages 49, in a manner known in the art. Each of mold sections 21 and 21a is also usually provided with a mounting plate 83 for mounting on the usual mold platens of the aforementioned commercially available machines for opening and closing the mold comprising sections 21 and 21a in relation to extrusion of the parison and operation of the blowing apparatus such as blow pin 22, in a manner which will be apparent to those skilled in the art in light of the disclosure herein.

Figure 11:
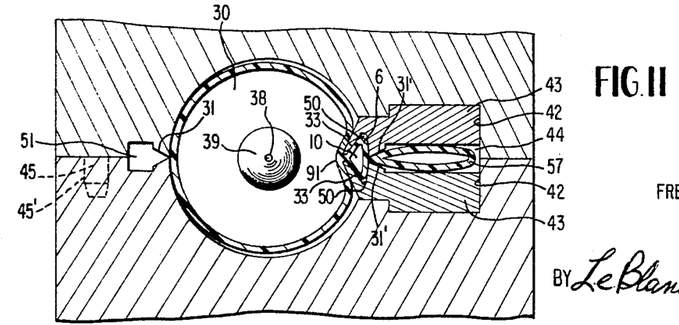
FIGURE 11 is a cross sectional view of the mold in its closed position, and illustrating deformation of the blow molded parison (but before completely blowing the main bottle portion)

Referring to the sectional views of FIGURES 4 and 9–11, side land 31 of each mold section 21 and 21a is machined and relieved per conventional practice to provide a clean bottle edge opposite the bottle discharge tube, since proper positioning of the mating mold sections 21 and 21a with respect to the extruding head 20 as explained below will eliminate the necessity of trimming this edge of the finished blow molded liquid dispensing bottle 4. However, a groove 51 of suitable width and depth extends longitudinally alongside land 31 for flash relief, if that should prove necessary by failure to follow procedures hereafter discussed. Still referring especially to FIGURES 4 and 9–11, the other bottle cavity side land 31' formed in the alloy tool steel insert 43 of each of mold sections 21 and 21a is designed and machined so that the mating lands 31' will cleanly pinch off excess parison when the mold sections 21 and 21a are closed, as shown in FIGURE 11 and further discussed below. Land 31' formed in alloy tool steel insert 43 preferably has a cross sectional construction with angular reliefs as shown at 92 and 94 in the FIGURE 4A enlarged segment of FIGURE 4 to effectively accomplish the above-stated functions and results.

However, referring particularly to FIGURES 1, 4, and 9–11, previously described lands 33 extending alongside land 31' on mold sections 21 and 21a do not meet when the mold sections are closed (as in FIGURE 11). Instead, the edge of each of lands 33 extends short of the plane of abutting lands 31, 32, 31' (when dies 21 and 21a close, per FIGURE 11) for a minimum distance substantially equal to at least one-half (½) the minimum feasible thickness of web 9 for satisfactorily joining discharge tube 6 to the main portion 5 of a unitary blow molded wash bottle 4 or like liquid dispenser. Also, matching lands 33 stop short of bottom lands 32 a sufficient distance, indicated at 90 in FIGURE 1, so as to provide an adequate size opening 11 in communication with passage 10 in integral discharge tube 6. Preferably discharge tube forming lands 33 terminate short of bottom cavity lands 32 a distance 90 sufficient to provide bottom opening 11 with a cross section area at least as large as, or possibly larger than, the cross sectional area 10 of discharge tube 6 with the latter to be determined in accordance with criteria discussed below (particularly to meet the requirements of a satisfactory plastic laboratory wash bottle).

Figure 5:
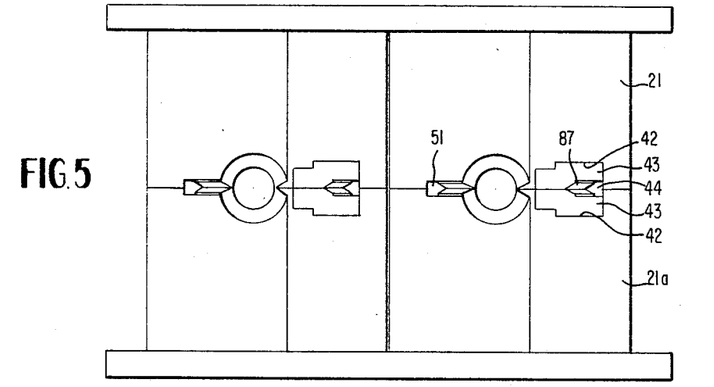
FIGURE 5 is a bottom plan view of the blow molding apparatus of the invention as partially illustrated at FIGURE 1 showing two halves of the blow mold, in a double mold arrangement whereby a plurality of bottles may be simultaneously blow molded.

FIGURE 5 illustrates in plan view how corresponding mold sections 21 and 21a are mated to provide the desired shape bottle mold. As shown, the mold may include a number of pairs of bottle mold sections to simultaneously blow mold a plurality of unitary wash bottles.

Figures 9, 10:
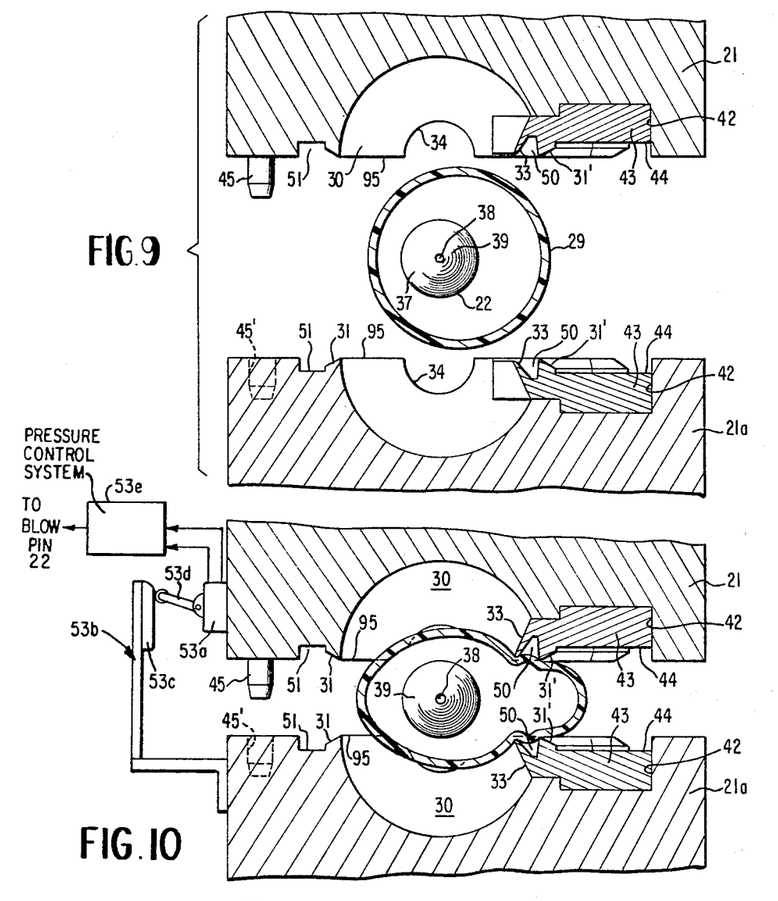
FIGURE 9 is a horizontal cross sectional view of the two mold sections of the invention in their open position and of an extruded parison illustrating the eccentric relation of the parison to the mold sections and the blow pin.
FIGURE 10 is a horizontal cross section view like that of FIGURE 9 but showing the two mold sections in a partially closed position and illustrating partial deformation of the parison.

Referring now to FIGURES 9-11, these respectively show initial, intermediate, and final positions of the mold sections 21 and 21a as they close around the plastic parison 29. In FIGURE 9, the blow pin 22 is shown after portion 39' has been inserted within the lower portion of plastic parison 29. The mold sections 21 and 21a have not yet made any contact with the parison 29, and therefore its initial substantially cylindrical shape has not yet been distorted.

In FIGURE 10, there is illustrated an intermediate position of the mold sections, wherein the edges of lands 31' and 33 which define mating recesses 50 in each of mold sections 21 and 21a, abuttable mold section faces 95, and reduced mold neck forming sections 34 are shown as making contact with the plastic parison 29 and deforming and flattening the parison.

Finally, in FIGURE 11, mold sections 21 and 21a are shown in their closed positions. The general shape of the blow molded wash bottle cross section may now be seen. As shown in FIGURE 11, the major part of plastic parison 29 forming the main bottle portion 5, has not yet made full contact with the sides of the mold cavities 30 to form the bottle wall 8 to final configuration of the mold; but the continuing pressure of the air supplied through passage 38 in blow pin 39' will cause full conformity of the plastic material with the surfaces of the mold cavity when the blowing process is complete. Bottle discharge tube 6 is formed within the mating recesses 50 of mold sections while the web 9 which separates the container portion 5 of the bottle 4 from the discharge tube 6 is formed in the clearance 91 between lands 33.

As shown, a certain amount of the plastic material of the parison 29 becomes flashing within the mating flash relief depressions 44 of mold sections 21 and 21a, as shown at 57, since at the lower end of the mold 21-21a, the bottle spout portion 13-13' is simultaneously blow molded from this portion of the flattened parison 29 within the mating recesses 86 defined by lands 87, 88 and 89 (see especially FIGURE 1).

As shown in FIGURE 10, contact of portions of the plastic parison 29 with the aforementioned various components 31', 33, 95 and 34, etc. of the closing mold sections 21 and 21a will unavoidably cause deformation of the plastic material, which may result in molding malfunction as the mold sections close, especially in the region of mating mold section lands 33 and 31. Hence, it is desirable to provide means for assuring that the plastic material conforms to the mold surfaces so that a properly shaped bottle discharge tube and spout may be successfully blow molded with the main bottle portion. A preferred system of achieving this is by "pre-blowing" the parison 29. To this end, control means are provided so that when the closing two mold sections 21 and 21a reach the position at which lands 33 and 31' forming mating bottle tube recesses 50 contact parison 29 and start to deform it, air at low pressure (e.g., 2-5 p.s.i.) is introduced through aperture 38' in blow pin 39' to force the deforming parison 29 to conform generally to the mold shape in the vicinity of mating recesses 50 formed by lands 33 and 31'. Such control means may be of any convenient or desired type known in the art and customarily used for such purposes. By way of example, a limit switch 53a is affixed to mold section 21 for cooperation with a cam assembly 53b on complementary mold section 21a, as illustrated in FIGURE 10. A cam 53c is positioned to deflect actuating arm 53d of limit switch 53a when mold sections 21 and 21a reach the desired degree of closure. Limit switch 53a is electrically connected to the blow mold pressure control system 53e which provides the desired preblow pressure to blow pin 22. As the mold sections completely close, which closure may be determined by micro-switch means and control circuitry, the regular air pressure source for blow head 22 is opened to blow mold the plastic material, expanding it into conformity with all portions of the mold cavity, as shown in FIGURE 11, and explained above, thus forming the unitary wash bottle or liquid dispenser 4.

While the use of such a pre-blow of the parison as the mold cavity is closing is not absolutely essential, it has been found that this method is highly advantageous for rapid, efficient, low cost production by eliminating malfunction, precise operational control, and product deficiency and rejects, due to the configuration of the bottle and mold apparatus, sway of parison 29, etc., thereby decreasing the unit cost of commercially suitable wash bottles produced from a given press and mold. If pre-blowing is used, it is necessary to properly time the application thereof in relation to the closure of the mold sections 21 and 21a, location and size of parison, and other pertinent molding conditions. In one suitable embodiment, the time for pre-blow may be approximately one second, with a relatively low pre-blow pressure in the range of approximately two to five p.s.i.; followed, upon final closure of the mold sections, by a relatively high blowing pressure, in the range of approximately 50 to 120 p.s.i., and preferably about 60 to 90 p.s.i., for final blowing of the bottle.

It will be noted that with the above-described novel method and apparatus, the mating lands 33 forming bottle web 9 do not extend all the way to bottom lands 32, thus providing an opening at 90 (see FIGURE 1) so that the main mold cavity 30 is in communication with mating recesses 50 between lands 33 and 31'. Hence, the compressed air from blow pin 39' introduced into parison 29 passes from within the main portion of parison 29 in cavity 30 through opening 90 to simultaneously blow discharge tube 6 and spout 13-13' which are sealed from the main blow bottle portion 5 by web 9 compression formed between mating lands 33.

Figure 16:
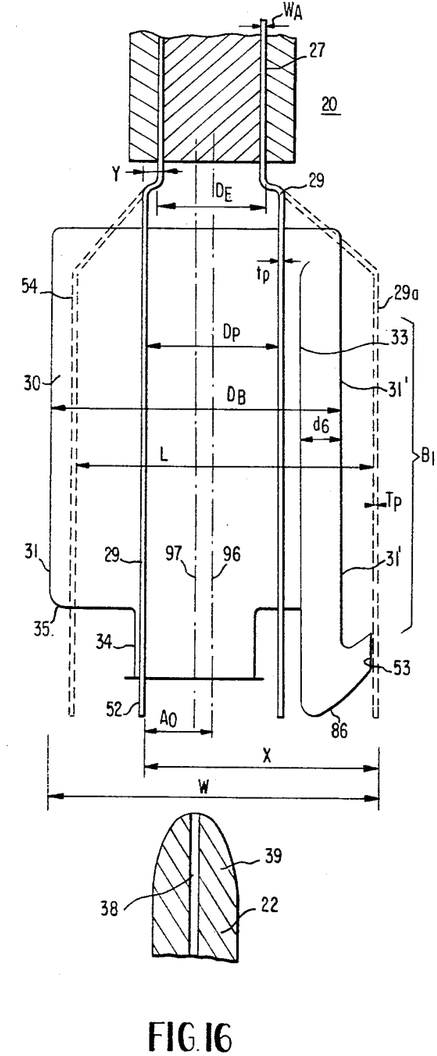
FIGURES 16 and 17 are illustrations of the relationship of the extruding head, mold, blow pin, and parison in accordance with this invention.
Figure 17:
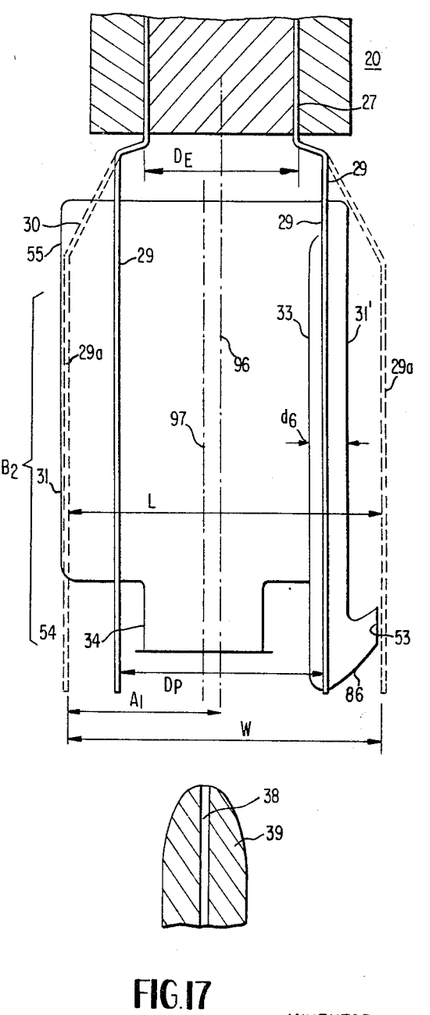

Referring now to FIGURES 16 and 17, there will now be explained the novel manner in which the relative positioning of the extruding head 20 and the mold sections 21 and 21a is determined according to the present invention.

FIGURE 16 shows, in vertical sectional view, the extruding head 20, the outline of the cavity portion 30 of mold section 21 and the blow pin 22 in its non-operating vertically displaced position below the mold section 21 (and mold section 21a). Shown within the extruding annulus 27 is the plastic material 27a as it is being formed into the parison 29. As shown, the diameter $D_E$ of the extruding annulus 27 is smaller than the diameter $D_P$ of the extruded parison, in accordance with the known phenomenon of "swell" oftentimes encountered in the extrusion of polyethylene and other thermoplastic materials suitable for blow molding according to this invention. However, it should be understood that these and other materials contract or neck down rather than swell under some circumstances, which would result in a parison of diameter smaller than $D_E$ but would not otherwise affect the practice of this invention.

Note: For purposes of convenient explanation, the diameters $D_E$ and $D_P$ are taken as the average diameters of extruder annulus 27 and parison 29, respectively. Also, for illustrative examples, reference is made to low density polyethylene (LDPE) having a parison "swell ratio" of about 1.15. However, the "swell ratio" of thermoplastic materials suitable for this invention might commonly vary from 1.3 to 1.0, or even less due to neck down. ("Swell ratio" is commonly the ratio of outside diameter of the extruded plastic parison 29 to the inside diameter of extruder die bore 24.) The thickness $t_p$ of the extruded parison 29 increases in relation to the radial width $W_A$ of extruder annulus 27 approximately according to this "swell ratio." Thus, in practice, adjustment would be made for said average diameters $D_E$ and $D_P$, according to such variation of extruded parison thickness $t_p$.

Referring briefly to FIGURES 3, 5, and 10, it may be seen that as the mold sections 21 and 21a close around the parison 29, contact with mold section lands 31, 32, 31' and 33, and mold parts 34 and 95, will cause the plasticated parison 29 to assume a generally flat shape as shown in FIGURE 10. This flattening of parison 29 is indicated in FIGURE 16 by lines 29a. It should be recalled that in the process of blow molding, the mold sections 21 and 21a are closed around parison 29 and the blow pin 22 is inserted into the neck opening defined by regions 34 of the mold sections 21 and 21a. The bottle neck portion 15 may be of any desired diameter, but the diameter of blow pin portion 39 is made of such size that when the blow pin is inserted into tubular parison 29 and the neck forming parts 34 of mold sections 21 and 21a close around portion 39, the neck portion 15 of the bottle 4 is compression molded during blow molding of the bottle itself.

The diameter of the extruding annulus 27, $D_E$, and the relative positioning of the extruded parison 29 with respect to mating mold sections 21 and 21a is of course in part dependent upon the size and shape of the finished bottle. Since blow pin portion 39' is to be inserted within the parison 29, the left side 52 of extruded parison 29 should be positioned adjacent the corresponding side of reduced neck portion 34 of die sections 21 and 21a and should also be far enough toward the left side of the mold cavity to permit the side 52 of parison 29 to clear the corresponding side of blow pin portion 39'. Further, the flattened parison 29 should extend at least as far as the right-most edge 53 (in FIGURE 16) beyond the mold portion 86 forming bottle spout 13–13' (see also FIGURE 6).

To meet the stated conditions for a mold having the right-most blowing portion at 53 extending a distance X from the left side of the neck forming portion 34 (see FIGURE 16), the minimum value for the diameter $D_E$ of the extruding annulus 27 should be approximately 0.70 X, using LDPE.

The positioning of the extruding head relative to the blow pin so as to assure clearance of portion 52 of the parison by the blow pin may be subject to variation depending on the configuration of blow pin portion 39'. E.g., if a tapered blow pin is used having a truncated conical configuration as shown in the drawings, the edge 52 of the parison need only be located so as to insure that the narrowest portion of the blow pin portion 39' will enter inside the lowermost section of the parison 29 since the tapered side of pin 22 tends to displace the plasticated parison 29 toward neck forming portion 34 of the mold as it is inserted, for molding of the bottle neck as shown. However, in volume production (with either a tapered or substantially cylindrical pin portion 39'), it is desirable to position the extruding head 20 so that the lower end of extruded plasticated parison 29 will be extended substantially adjacent to neck forming portion 34 as shown in FIGURE 16,—at least when mold sections 21 and 21a are in closed position, and preferably when they are in open position—to insure clearance and to reduce malfuc-function which might result from reliance on lateral displacement of the parison 29 during the molding operation. The minimum operable value for $D_E$ stated above (0.70 X for LDPE) is substantially independent of the shape of the blow pin, since after insertion of the pin in extruded parison 29, the latter will be positioned immediately adjacent to the mold neck forming portion 34 at the time of molding (as shown in FIGURE 16); and, it is in this position that the above-stated requirement for the lateral extent of the flattened parison must be met. However, use of a tapered blow pin will permit some variation in the precise size of extruded parison 29 and the use of average diameter $D_E$ of the extruding die and/or location of its axis 96 with respect to blow pin axis 97, in light of the disclosure herein.

Assuming now, an extruded parison as shown in FIGURE 16, with left side substantially adjacent the neck-forming opening for a given value of $D_E$, optimum positioning of the extruding head 20 with relation to mating mold sections 21 and 21a to position the side 52 of parison 29 immediately adjacent the side of mold neck portion 34 will result in a displacement of the central axis 96 of the extruding head 20 with respect to the central axis 97 of the blow pin 22, and thus with respect to the bottle neck forming mold portions 34. This displacement will depend in part on the particular material used for the bottle. E.g., for LDPE, it has been found that if the left side of the bottle neck 34 (in FIGURE 16) is used as a reference, the displacement $A_0$ of the extruding head axis 97 (see FIGURE 16) will be approximately equal to 0.58 times the diameter $D_E$ of the extruding annulus 27. For a bottle made of LDPE with given dimensions establishing distance X in FIGURE 16 according to the foregoing, the values of $D_E$ and $A_0$ indicated above determine operative conditions for the present invention, and also the optimum conditions for conservation of plastic material.

For a given value of $D_E$, displacement of the axis 96 of the extrusion head 20 with respect to mold sections 21 and 21a by a distance $A_0$ substantially greater than 0.58 $D_E$ will result in positioning the extruded LDPE parison 29 so that its left edge will not clear the left side of the blow pin portion 39'. Of course, use of a tapered blow pin will permit some variation and will also reduce somewhat the criticality of this limit, as will be apparent to those skilled in the art in light of the disclosure herein. For displacement of extrusion head 20 with respect to mold sections 21 and 21a by a distance $A_0$ substantially smaller than 0.58 $D_E$, the flattened extent L of an LDPE parison 29 will be insufficient to provide the required material to properly form the discharge tube 6 and spout 13–13' of a unitary blow molded bottle such as in FIGURE 6. If the left end of the parison 29 is kept immediately adjacent the left side of mold neck portion 34 (per FIGURE 16), and the parison diameter and displacement $A_0$ of extruding head 20 are increased, then the righthand edge 29a of the flattened parison will extend beyond the right-most portion 53 of the mold and will result in unnecessary waste of material and increased cost of manufacture.

Still referring to FIGURE 16, as the diameter of extruding annulus $D_E$ of head 20 is increased, the condition will be reached where the left side 54 of the flattened parison 29a will reach or extend beyond the left side 55 of mold cavity 30 (determined by mating lands 31). This will cause lands 31 to pinch the parison at this side of the mold, producing a seam in the container wall and flashing in the flash relief spaces shown at 51 in FIGURES 4 and 9–11. Besides resulting in avoidable waste of material, this makes it necessary to trim and finish this portion of the bottle after it has been molded, thus significantly increasing costs, and further, the bottle wall is weakened along this line, resulting in an inferior product. Accordingly, the method and apparatus should be practiced so that flattened parison 29 does not extend to the left (at 54 in FIGURE 16) beyond edge 55 of mold cavity 30 determined by mating lands 31 of die sections 21 and 21a.

Referring now to FIGURE 17, it is again desirable that the flattened parison 29 not have its edge 29a extend any substantial distance beyond the right-most edge 53 of the mold cavity to avoid waste of material. Thus, for an LDPE wash bottle with spout 13 having a maximum transverse width W per FIGURE 17, the maximum desirable value for extruding annulus diameter $D_E$ has been determined to be approximately 0.56 W. Again, for factors discussed with reference to FIGURE 17, the placement of extruding head 20 and the axis of extruding annulus 27 with respect to the mating mold sections 21 and 21a will depend in part on the particular plastic material from which the bottle 5 is to be made. For low density polyethylene (LDPE), it has been found that the maximum value of the distance, $A_1$ between the axis 96 of extruding annulus 27 and the left-most edge 55 of the mold cavity 30 (determined by mating lands 31) should be less than approximately 0.9 times the diameter $D_E$ of the extruding annulus.

Maintaining a fixed distance $A_1$ between extruder axis 96 and mold cavity edge 31, and decreasing the size of extruding head diameter $D_E$, will result in an insufficient flattened parison length L to properly form the discharge tube portion 13–13′ of the bottle 5; while increasing the diameter $D_E$ for a fixed value $A_1$, will result in flash on the left side of the bottle and weakening of the seam pinched by lands 31 when the die sections 21 and 21a close.

The above stated ranges of suitable values of $D_E$, $A_0$, and $A_1$, have proved to have remarkable general applicability to all sorts of LDPE bottles of such configurations as defined by mold cavity 30, and to depend neither upon the actual diameter of the bottle neck, nor upon the diameter of the container nor discharge tube portions of the bottle. The only dimensions which need be fixed are the total lateral width W, and the distance X between the lefthand end of the bottle neck and the rightand end of the dispensing spout.

By way of example, the novel method and apparatus of the present invention may be used for manufacture of 4, 8, 16, and 32 oz. and other size LDPE plastic laboratory wash bottles of construction such as shown at 4 in FIGURE 6.

For 16 oz. (i.e., 500 ml.) capacity bottles, approximate values for pertinent dimensions may be:

| | Inches |
|---|---|
| Bottle height | 6 |
| Bottle body outside diameter $D_B$ | 3 |
| Bottle neck diameter | 1 |
| Distance between neck and spout, X | 2.5 |
| Total extent W | 3.5 |
| Neck height | 0.5 |

It should be recognized that thermoplastic materials other than low density polyethylene (LDPE) may be used to manufacture the blow molded unitary liquid dispensing bottles of the present invention.

In this regard, it has been found that optimum results may be achieved with any blow-moldable thermoplastic material if certain relationships between W, X, and $D_P$, the diameter of the parison (shown at 29 within brackets $B_1$ and $B_2$ in FIGURES 16 and 17) are maintained. These relationships depend neither upon the actual diameter of the bottle neck, nor upon the diameter of the container nor discharge tube portions of the bottle, for all known suitable thermoplastic materials. The only dimensions which need be fixed are the total lateral width W, and the distance X between the lefthand end of the bottle neck and the right-hand end of the dispensing spout 53. Thus, referring to FIGURES 16 and 17, for optimum results with any suitable plastic, the relationship of the extruded parison portion 29 with respect to mating mold sections 21 and 21a (in the region of brackets $B_1$ and $B_2$) should be according to the following parameters:

1

W = total lateral extent of the bottle (from 31 to 53), determined by desired bottle design.

2

(a) X = distance from the left end of the neck opening 34 of the mold (or bottle) to the end 53 of the spout 13–13′, determined by desired bottle design; provided that (b) X should not exceed about 0.8 W.

3

(a) $D_P$ = average diameter of the extruded parison portion 29 (within region of brackets $B_1$ and $B_2$).

(b) $D_P$ should be at least equal to or greater than about 0.8 X; provided that (c) $D_P$ should not exceed about 0.65 W.

However, generally, the relationship between the value of $D_E$ and $D_P$ as well as the values of $A_0$ and $A_1$, discussed above with reference to FIGURES 16 and 17, will depend partly on the chosen plastic material and the specific swell ratio involved, consistent with the disclosure herein.

Thus, the term "plastic" as used herein (and in the claims below) refers to any thermoplastic material suitable for blow-molding a unitary liquid dispensing bottle utilizing the present invention, including, without limitation, low density polyethylene (LDPE), medium density polyethylene (MDPE), high density polyethylene (HDPE), and polyvinyl chloride (PVC), which are commercially available from various sources. The term low density polyethylene or LDPE refers to various forms of commercially available low density polyethylene and copolymers thereof, which may be compounded with small amounts of antioxidants, coloring agents, opacifiers, and filters, and which may have a swell ratio ranging from about 1.0 to 1.3, and usually about 1.15.

The novel molding apparatus and method of the present invention also involves certain other unique aspects as a result of the advantageous unique cross sectional configuration of blow molded unitary dispensing bottle 4 and its use as a laboratory wash bottle. For example, it has been determined that a laboratory wash bottle made of low density polyethylene resin (0.92 density) should have a minimum wall thickness $t_8$ (see FIGURE 7) of at least about 0.035 to 0.060 inch for the main container portion 5 and that the interior cross sectional area of the discharge tube passage 10 must be at least 0.04 square inch for satisfactory mechanical resiliency and strength and good dispensing characteristics. It also has been found that the parison wall thickness $t_p$ (see FIGURES 1, 16 and 17) will be about 4.0 times the wall thickness $t_8$ of the main wash bottle portion 5. The thickness of web 9 between main bottle section 5 and dispensing tube 6 (see $t_9$ in FIGURE 7) should be at least about 0.03; and a comparable spacing is therefore provided between the ends of mating web forming lands 33 (as shown especially in FIGURE 11 and discussed above). Further, the radial dimension $t_{9a}$ of web 9 (see FIGURE 7) should be at least about 0.01 inch. Taking into account these factors, it has been found that irrespective of the remaining geometry of the mold 21–21a and the finished wash bottle 4, it is necessary that the operative surfaces of land 33 must be spaced from land 31′ a distance $d_6$ of at least about 0.20 to 0.25 inch, using low density polyethylene resin.

The above factors are further found to affect the annular width of the extruding head 20. Assuming that a suitable wall thickness $t_8$ is 0.035 inch to 0.050 inch, it is found that for low density polyethylene, a suitable minimum width $W_A$ for the extruding annulus is approximately 0.08 inch.

Further, for resin other than LDPE, determination of the annular width $W_A$ of the extruding head 20 and of the distance between lands 33 and 31′ will depend in part on the particular plastic material chosen for the bottle and other factors consistent with the disclosure herein.

The configuration of the blow molded dispensing bottle 4 shown in FIGURES 6–8 is not only attractive in appearance, thereby increasing salability, but also results in the dispensing tube 6 being within the extended circular periphery of main container section 5 of bottle 34, which is preferable for packing and for storage. However, unitary blow molded dispensing bottles may be molded with other configurations, using the novel methods and apparatuses of the present invention.

Figure 15:
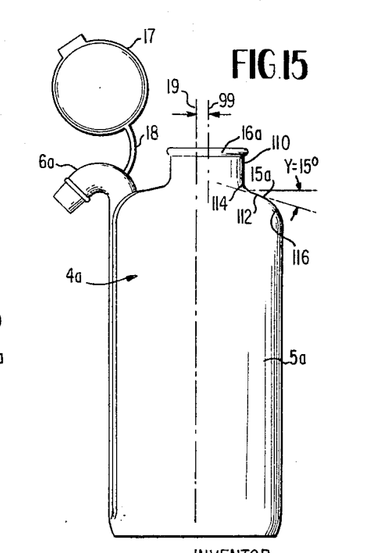
FIGURE 15 illustrates a blow molded wash bottle having an integral cap produced by the new method using the apparatus of FIGURES 12 through 14.

It is commercially advantageous to provide a modified form of the novel blow molded liquid dispenser or other container according to this invention with an integral simultaneously fabricated cap as shown in FIGURE 15, to which reference is now made. A bottle according to this embodiment, generally indicated at 4a, has a main container section 5a with an integral discharge tube 6a of cross section like that shown in FIGURE 7; but cap 17 is connected to part of bottle 4a by a suitable connecting strip 18, with cap 17 being designed to snap fit over lip 16a of bottle neck 15a to prevent loss of the cap 17. The cap 17 is fabricated concurrently with the was bottle container portion and discharge tube, as hereafter amplified. As shown in FIGURE 15, in this modified bottle 4a, neck portion 15a (and its central axis 99) is preferably laterally displaced from central axis 19 of the main bottle, portion 5a, thus achieving a significant saving of raw material in fabrication of such a blow molded bottle having an integral cap, as explained below.

In addition, the shape of bottle neck portion 15a is preferably designed to transfer vertical force applied to snap fit cap 17 on neck opening lip 16a to minimize ejection of contents of the bottle 4a due to "oil can effect" when cap 17 is pressed down on neck 15a. Referring to FIGURE 15, this is achieved by providing neck 15a with a conical section 112 disposed at an angle $y$ of at least about 15 degrees with adjoining neck portions 114 and 116 on either side thereof having a relatively large radius (e.g. at least 1/4–3/8 inch, for the illustrative 16 ounce bottle example discussed above). Neck 15a should have a substantially cylindrical section 110 below lip 16a and above arcurate portion 114 to avoid interference when the cap 17 is snap-fitted over lip 16a.

Figure 12:
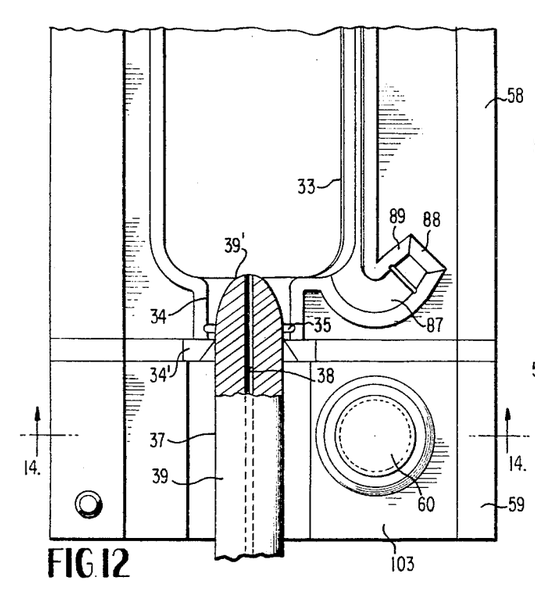
FIGURE 12 is a side elevation view of a modified embodiment of the invention showing a blow mold section (similar to that of FIGURE 1) combined with a compression molding core.
Figure 13:
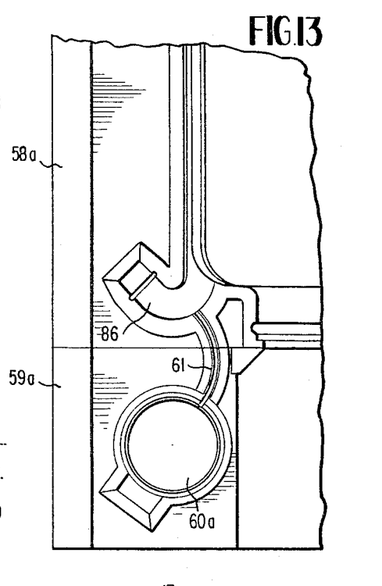
FIGURE 13 is a side elevation view relating to the embodiment of FIGURE 12, showing part of the complementary blow mold section and compression molding die used with the mold section shown in FIGURE 12.
Figure 14:
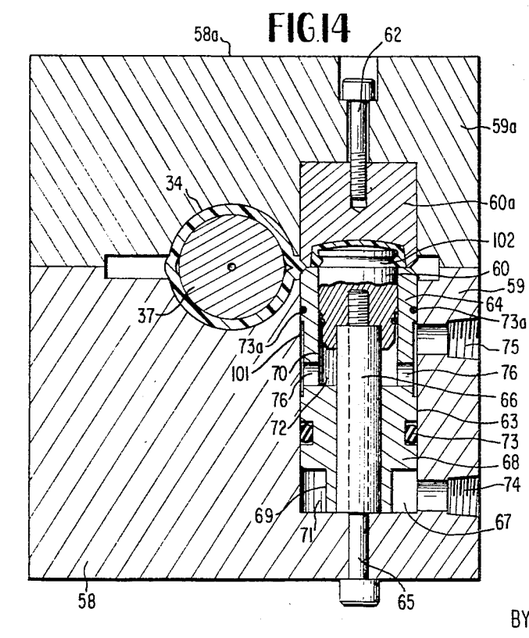
FIGURE 14 is a cross section view of the two mold sections of this embodiment in their closed position taken along line 14—14 in FIGURES 12 and 13.

Referring now especially to FIGURES 12, 13 and 14, there is shown a preferred form of novel apparatus for practicing the novel method of this aspect of my invention to produce a novel blow molded plastic bottle, especially of liquid dispensing type, with a unitary cap and connecting stem, and particularly wash bottle 4a of construction shown in FIGURE 15.

For clarity, and to minimize duplicate description, parts in the apparatus embodiment of FIGURES 12–14 which are the same as corresponding parts in the apparatus of above-discussed FIGURES 1–5, 9–11, 16 and 17, are identified with like numerals as in these prior-discussed figures; and modified parts of the apparatus of FIGURES 12–14 which are comparable to parts in the embodiment of FIGURES 1–5, 9–11, 16 and 17, are identified with like numerals as in these figures plus the letter $b$ to the extent feasible.

FIGURE 12 shows a mold section 58 which in part is the same as mold section 21, but differs from the mold section 21 by the addition thereto of another submold section 59 containing the male portion 60 of a compression molding die which is shaped to produce the desired configuration of bottle cap 17, and is constructed as below amplified with reference to FIGURE 14.

FIGURE 13 shows the construction of the other mating mold section 58a, which is in part the same as mold section 21a, but differing from it in that mold section 58a also includes another sub-mold section 59a containing the female portion 60a of the compression molding die for forming integral cap 17. It should be understood that the placement of the male and female compression die sections 60 and 60a on blow mold sections 58 and 58a may be interchanged.

As shown in FIGURES 12 and 13, in order to permanently attach the molded bottle cap 17 to the bottle 4a, the female die portion 60a includes a recess 61 connecting the bottle cap forming portion of the compression die with any suitable portion of the bottle cavity of the blow molding die section; e.g., to blow molding die recess 86 for forming the spout portion 13 of the bottle.

FIGURE 14 shows the details of a preferred construction of the bottle cap compression molding apparatus, in a sectional view taken along line 14—14 of FIGURES 12 and 13. As shown, the female die member 60a is suitably fixed to extended portion 59a by means such as cap screw 62 (or may be formed integrally therewith if desired). Extended compression molding section 59 which houses the male die member 60 comprises a bored cylindrical chamber 63, which contains the male die member 60 and a suitable stripping sleeve 64. Male compression molding die member 60 is fixed within the chamber 63 in such position as to project into female mold member 60a when the two mold sections 58 and 58a are united (when blow mold sections 58 and 58a are closed). Male die member 60 may be supported within the bore by means of a bolt 65 passing through bore 63 in mold section 59 and threadedly secured to die member 60 as illustrated, with a suitable bushing 66 provided to position male die member 60 within bore 63.

Stripping sleeve 64 is annular and arranged for axial motion within bore 63 along bushing 66 to assure separation of the molded cap 17 from the male die member 60 when molding is completed and the mold halves opened. Sleeve 64 has an extension 69 which normally rests against the wall 67 of bore 63 and also includes a suitably shaped cylinder section 68 whereby two reduced diameter portions indicated at 69 and 70 define two pressure chambers 71 and 72. An O-ring 73 may be positioned in a recess in the sleeve to separate the two pressure chambers. Additional O-rings 73a and 73b may be added to provide greater isolation between the chambers if needed to prevent leakage of air from one chamber to the other. Pressure inlets 74 and 75 are provided in the wall of compression die section 59 for communication with bore 63 and each of the two pressure chambers 71 and 72, respectively. The stripping sleeve 68 also contains one or more passages 76 offset from the pressure inlet 75 and in communication therewith via annular groove 101 when the stripping sleeve 64 is in engaged position at the interface between mating compression die sections 59 and 59a. Upon the separation of the mold sections 58 and 58a, compressed air from a suitable source is introduced through inlet 74 to pressure chamber 71 to move the stripping sleeve (upward in FIGURE 14) to displace the compression molded cap 17 and positively separate it from the male die member 60 to which the cap 17 tends to adhere due to undercut 102 (instead of moving with female die member 60a). Upon separation of mold sections 58 and 58a, air under pressure is introduced into pressure chamber 72 through inlet 75, groove 101 and apertures 76 to return the stripping sleeve 64 to its rest position. Cooling media may also be introduced into these sections if found necessary or desirable.

For the embodiment of FIGURES 12–15, a sufficient length of parison 29 is extruded, e.g., to mold edge 103 so that the integral cap portion 17 may be simultaneously molded beneath the spout blow molding portion 86 of the bottle blow mold sections. However, it will be recognized from the relative positioning of the blow pin 22, reduced diameter neck forming blow mold portion 34, and the spout forming portion 86 of the blow mold sections, that the compression cap molding apparatus shown in FIGURES 12–14 should be positioned entirely to the right of the blow pin in order to avoid interference therewith. Therefore, when it is desired to make a cap 17 having a diameter greater than the distance between the adjacent side of the bottle neck and the furthest end of the spout 13—13′, it is desirable to displace neck portion 15 and its axis 99 from the bottle axis 19, as shown in FIGURE 15, for a sufficient distance to permit compression molding of cap 17 of the desired size from the portion of the parison extending below spout blow molding section 86, to avoid waste of material.

Referring again to FIGURES 16 and 17, it may be seen that this involves increasing the dimension X while keeping the dimension W fixed. Thus, mating neck portions 34 of the blow mold sections may be displaced sufficiently to produce the desired integral cap 17, according to the embodiment of FIGURES 12–15, without any change in the basic requirements for either operative or optimum molding apparatus design and procedures as described in connection with FIGURES 16 and 17. However, if the distance X is so increased as to place the bottle neck forming mold portion less than a certain distance from the lefthand wall of the bottle as shown in FIGURE 17, then it will no longer be possible to position the blow mold sections with respect to the extruding head 20 so as to assure insertion of portion 39' of the blow pin 22 within parison 29, while avoiding production of flash to the left of the bottle wall (per FIGURES 16 and 17). For a particular diameter of bottle neck 15a, and bottle width W, it has been determined that a limiting value of X is approximately 0.81 W. Beyond this, in order to increase the available area for simultaneous compression molding of the cap 17, it is necessary to decrease the diameter of the neck forming portion 34 of the blow mold sections (and thus of bottle neck 15a).

While specific embodiments of this invention have been described in detail, it should be recognized that substantial departure from the specific details shown is possible within the scope of this invention. For example, the shape of the desired bottle, and therefore the particular configuration of blow mold cavities 30 of die sections 21 and 21a (and 58 and 58a) are subject to wide variation in accordance with the intended use of the bottle. While the bottles of FIGURES 6 and 15 have been shown as having the discharge tube portions thereof formed within the periphery of the main container portion, which is preferable, as discussed above, this placement may be varied with variation accordingly of both dimensions X and W of FIGURES 16 and 17.

The particular configuration of cap 17 shown in FIGURES 12–15 is of course subject to variation, as is the particular type and position of the attaching link 61 between the cap 17 and the bottle 4a. In fact, it may be desirable under certain circumstances to mold the bottle and cap concurrently as shown, but without any attached link between them such as 61.

It is also possible to use the method and apparatus inventions of FIGURES 12–14 to make a conventional blow molded bottle and connected compression mold cap as shown, but without the integral discharge tube utilized for making a liquid dispensing bottle, by elimination of land 33 and associate spout forming portions 86–89 (see FIGURE 1) and joining land 31' to the adjacent land portion at the side of neck forming section 34 (i.e., making side land 31' like side land 31). The manner of doing this will be apparent to those skilled in the art in light of the disclosure herein, whereby further amplification is deemed unnecessary.

The precise nature of the male die member and stripping sleeve, etc. is subject to variation from that shown in FIGURE 14. For example, instead of an upper air pressure chamber 72 and associate conduit 75, 101, 76 for returning the stripping sleeve 64 to rest position, there may be provided spring biasing or like mechanical means to return stripping sleeve 64 to its rest position in the absence of air pressure in the lower pressure chamber 71.

In the event it is desired that the blow molded wash bottle have a screw threaded neck for a screw on cap instead of a snap ring for cap as shown at 15' in FIGURE 15, neck forming portions 34 of mold sections 21 and 21a may be appropriately modified to compression mold a screw threaded bottle neck in a manner which will be apparent to those skilled in the art in light of the disclosure herein.

In the following claims, various relationships of significance in defining the invention are stated in terms of dimensions shown in FIGURES 16 and 17. Therefore, it is to be understood that the terms, W, X, $A_0$, $A_1$, $D_E$, $D_P$, etc., are used in accordance with the definitions thereof given in the specification in explanation of FIGURES 16 and 17 and are to have the meanings there stated.

Various other modifications are contemplated and may obviously be resorted to by those skilled in the art without departing from the spirit and scope of the invention as hereinafter defined in the appended claims.

What is claimed is:

1. A blow mold for forming from a tubular parison a plastic container having a body and an integral discharge tube comprising: a pair of mold sections, each including a pair of recessed portions engageable to form two adjacent hollow cavities communicating in one region, one of which cavities defines the shape of the container body and the other of which defines the shape of the discharge tube, said recessed mold portions being partially separated by lands on each of the mold sections of such length and configuration as to provide communication between the body cavity and the discharge tube cavity in said one region with slight clearance over an extended area to mold a common wall between said container body and discharge tube and also to define egress means to the outside of the container through a different portion of the discharge tube cavity.

2. A blow mold as defined in claim 1 wherein said mold sections include portions which cooperate to mold a neck for the container, and further including on each mold section one portion of a compression molding die for forming a removable closure for the neck opening out of an otherwise wasted portion of the parison concurrently with the molding of the container, at least one portion of said compression molding die being in communication with at least one of the recessed portions of the respective mold section to mold a connecting strip between said removable closure and the wall of the container.

3. A blow mold as defined in claim 2 wherein the neck molding portions of said mold sections are displaced from the central longitudinal axis of the mold, and wherein said compression molding die portions are partially situated in the area vacated by said displacement of said neck molding portions.

4. A blow mold as defined in claim 1 wherein said mold sections include portions which cooperate to mold a neck opening for said container, and wherein the distance X from the furthermost end of the discharge tube portion of each of said mold sections to the diametrically opposite end of the neck molding portion is less than or equal to approximately 0.8 times the lateral width W of the mold.

5. A blow mold for forming a tubular plastic parison into a unitary container having a body portion and an integral discharge tube portion comprising: a pair of mold sections engageable to form two hollow cavities corresponding to the desired shape of the two portions of the container; said cavities of each of the mold sections being bounded by a plurality of lands having the desired configuration to define the outline of said container, said plurality of lands including first and second lands forming one wall of the discharge tube cavity and the opposite wall of the body cavity respectively, a third land forming a further cavity wall defining a closed bottom for the container, segments of the first and second lands forming a passage corresponding to the shape of a neck portion for the container, portions of the first lands being suitably shaped to form the end portion of the discharge tube cavity, and a fourth land on each of the mold sections partially separating the body cavity from the discharge tube cavity and defining the shape of a common wall for the two portions of the container, said fourth lands having substantial clearance therebetween in one region when the mold sections are engaged to permit communication between the cavities in said one region and the remainder of said fourth lands being of sufficient height to permit a small clearance therebetween when the two mold sections are engaged except for said one region.

6. A blow mold as defined in claim 5 wherein each section of the mold includes one portion of a compression molding die for forming a removable closure for the neck opening integral with the container, from a portion of the parison outside said two hollow cavities concurrently with the molding of the container.

7. A blow mold as defined in claim 5 wherein the portion of each of said first lands forming the discharge tube cavity end portion comprises a first segment merging with the segment of said first land forming said neck passage and a second segment merging with the portion of the first land forming said one wall of said discharge tube cavity, said first and second segments being so disposed that the discharge tube cavity end portion generally depends both toward said third land and radially outward from said container cavity, and a third segment merging with said first and second segments to form a discharge orifice portion for the discharge tube cavity.

8. A blow mold as defined in claim 5 where the distance X between the furthermost edge of the discharge tube cavity to the opposite surface of the segment of said second land which forms said neck passage is less than or equal to approximately 0.8 times the lateral width W between said furthermost edge and the portion of said second land forming said opposite wall of said body cavity.

9. A blow molding machine for forming a container having a body portion and an integral discharge tube from plasticated material comprising; an extruding head for forming a tubular parison of plasticated material; a mold having a pair of mold sections positioned for closure around the extruded parison, the sections being formed so that upon closure they provide, a mold having two separate hollow cavities, one of which corresponds to the shape of the body of the container and the other of which corresponds to the shape of the discharge tube, the common boundary between the cavities being defined by a land means on each mold section of such height as to preserve a predetermined narrow clearance therebetween after closure of the mold, but having a segment of reduced height allowing substantial clearance between the mold sections to provide communication between the two cavity portions in the region of said segments, and outer land means on each of the mold sections defining the outline of the container and a passage at one end when said mold sections are engaged, with said passage defining a neck for the container body, said outer land means also including portions suitably shaped to define the configuration of an end portion of the discharge tube; and blowing means positioned for insertion into the neck-forming passage; the extruding head being positioned relative to the mold and blowing means so that upon extrusion of a parison and closure of the mold, part of the parison occupies the neck-forming passage with the blowing means disposed within the parison, the walls of the mold passage and the blowing means cooperating to compression mold the neck of the container; the diameter of the extruding head being sufficient so that upon closure of the mold, the parison will occupy a sufficient portion of the mold to insure that the parison extends into the cavity corresponding to the discharge tube portion of the container.

10. A blow molding machine as defined in claim 9 where the distance X from the furthermost part of the discharge tube cavity to the opposite wall of the neck passage is less than or equal to approximately 0.8 times the lateral width W across said outer land means.

11. A blow molding machine as defined in claim 10 wherein the extruding head is of such dimensions that the mean diameter $D_p$ of the extruded parison is less than or equal to about 0.65 W.

12. A blow molding machine as defined in claim 10 wherein the extruding head is of such dimensions that the mean diameter $D_p$ of the extruded parison is greater than or equal to about 0.8 X.

13. A blow molding machine as defined in claim 9 for molding low density polyethylene wherein the mean diameter of the extruding head $D_e$ is at least 0.7 times the distance X between the furthermost part of said discharge tube cavity and the opposite part of said neck passage, but is less than approximately 0.56 times the distance W between the furthermost end of the tip of the discharge tube and the opposite wall of the body portion.

14. A blow molding machine as defined in claim 9 for molding low density polyethylene wherein the axis of the extruding head is spaced from the part of said neck passage opposite said discharge tube cavity toward the center thereof a distance $A_0$ of approximately 0.58 times the mean diameter $D_e$ of the extruding head, and is spaced from the body cavity wall opposite the discharge tube cavity by a distance $A_1$ of approximately 0.9 times the mean diameter $D_e$ of the extruding head.

15. A blow molding machine as defined in claim 9 wherein the extruding head is of such dimensions that the mean diameter $D_p$ of the extruded parison is less than or equal to about 0.65 times the lateral width W across said outer land means.

16. A blow molding machine as defined in claim 9 where the extruding head is of such dimensions that the mean diameter $D_p$ of the extruded parison is greater than or equal to about 0.8 times the distance X from the portion of said outer land means which defines the furthermost end of the discharge tube to the opposite end of said neck passage.

17. A blow molding machine as defined in claim 16 wherein the extruding head is of such dimensions that the mean diameter $D_p$ of the extruded parison is less than or equal to about 0.65 times the lateral width W across said outer land means.

18. A blow molding machine for forming a container having a body portion and an integral discharge tube comprising: an extruding head for forming a tubular plastic parison from a plasticated material; a pair of mold sections positioned for closure around the extruded parison, and being so formed that upon closure, they provide a mold having two separate hollow cavities, one of which cavities corresponds to the body of the container and the other of which corresponds to the discharge tube, the common boundary between the cavities being defined by a land on each mold section of such height as to preserve a predetermined narrow clearance therebetween upon closure of the mold, but having a region of reduced height allowing substantial clearance between the mold sections in one region to provide communication between the two cavity portions in said region; said cavities being bounded by outer land means on each of the mold sections defining the outline of the container and having portions forming a passage at one end when said mold sections are closed, the shape of said passage defining a neck opening for the container body portion, said outer land means also including portions suitably shaped to define the desired shape of an end portion of the discharge tube; means adapted to be positioned within the parison so that upon closure of the mold sections, fluid under pressure may be delivered to the interior of the parison to expand the same into general conformity with the interior of the mold, whereby the molded product may be formed.

19. A blow molding machine according to claim 18 including means to sense the degree of closure of the mold sections, and means responsive to the sensing of a predetermined degree of incomplete closure to deliver through the blowing means a pressure less than that delivered upon complete closure of the mold to partially conform the parison to the contours of the mold sections in the vicinity of the discharge tube cavity.

20. A blow molding machine according to claim 18 wherein the distance X from the inner edge of the portion of said outer land means which defines the furthermost edge of the discharge tube end portion to the diametrically opposite side of said neck passage is less than or equal to approximately 0.8 times the lateral width W across said outer land means and wherein the extruding head is of such dimensions that the mean diameter $D_p$ of the extruded parison is less than or equal to about 0.65 W but greater than or equal to about 0.8 X.

References Cited

UNITED STATES PATENTS

| | | |
|---|---|---|
| 2,778,533 | 1/1957 | Savary. |
| 3,004,285 | 10/1961 | Hagen. |
| 3,100,317 | 8/1963 | Perry _______________ 264—98 |
| 3,167,104 | 1/1965 | Wiley et al. |
| 3,278,666 | 10/1966 | Donald _______________ 18—35 |
| 3,300,556 | 1/1967 | Battenfeld et al. |
| 3,317,955 | 5/1967 | Schurman et al. |

FOREIGN PATENTS 631,830 1/1962 Italy.

WILBUR L. McBAY, *Primary Examiner.*

KENNETH N. LEIMER, *Assistant Examiner.*